United States Patent [19]
Weser et al.

[11] Patent Number: 6,104,803
[45] Date of Patent: Aug. 15, 2000

[54] INTELLIGENT SERVICE PERIPHERAL DEVICE

[75] Inventors: Michael J. Weser, Richardson; Charles C. Lee, Jr., Plano, both of Tex.

[73] Assignee: Alcatel USA Sourcing, L.P., Plano, Tex.

[21] Appl. No.: 09/016,042

[22] Filed: Jan. 30, 1998

Related U.S. Application Data

[60] Provisional application No. 60/036,705, Jan. 31, 1997.

[51] Int. Cl.$^7$ ........................................................ H04M 3/42
[52] U.S. Cl. .......................... 379/230; 379/207; 379/220
[58] Field of Search ..................................... 379/201, 207, 379/219, 220, 221, 229, 230

[56] References Cited

U.S. PATENT DOCUMENTS 5,469,500  11/1995  Satter et al. ............................ 379/201

FOREIGN PATENT DOCUMENTS 9604743  2/1996  WIPO .............................. H04M 3/42
9613927  5/1996  WIPO .............................. H04M 3/42

OTHER PUBLICATIONS

S. Kabay, et al., "The Service Node–An Advanced IN Services Element", BT Technology Journal, vol. 13, No. 2, Apr. 1995, pp. 64–72.
A. Leconte, et al., "IN Valued Added"—the Role of the IP/SN in IN and Multimedia Applications, ISS Symposium, vol. 1, Apr. 23, 1995, pp. 206–210.

*Primary Examiner*—Scott Wolinsky
*Attorney, Agent, or Firm*—Baker Botts L.L.P.

[57] ABSTRACT

An intelligent service peripheral device (28) includes a service intelligent unit (50) and a media processing unit (52). The service intelligence unit (50) has an intelligent service peripheral manager module (90) and a SS7 interface module (58). The SS7 interface module (58) receives service requests for a call from a service switching point (12) for processing by the intelligent service peripheral manager module (90). The intelligent service peripheral manager module (90) determines a routing package for the call based on the service request for transport to the service switching module (90) through the SS7 interface module (58). For service requests requiring special features, the intelligent service peripheral manager module (90) passes the request to a media processor manager module (92) within the media processing unit (52). The media processor manager module (92) establishes a connection between the originator of the call and a carrier interface module (94) within the media processing unit (52). Information is exchanged between the originator of the call and the carrier interface module (94) according to basic features supported by the carrier interface module (94). For enhanced features, the carrier interface module (94) interfaces with a digital signal processor resource module (96). In response to the exchange of information, the media processor manager module (90) determines a routing package for the call. The media processor manager module (90) provides the routing package to the intelligent service peripheral manager module (90) for ultimate transfer to the service switching point (12) in order to complete connection of the call to an intended destination.

2 Claims, 7 Drawing Sheets

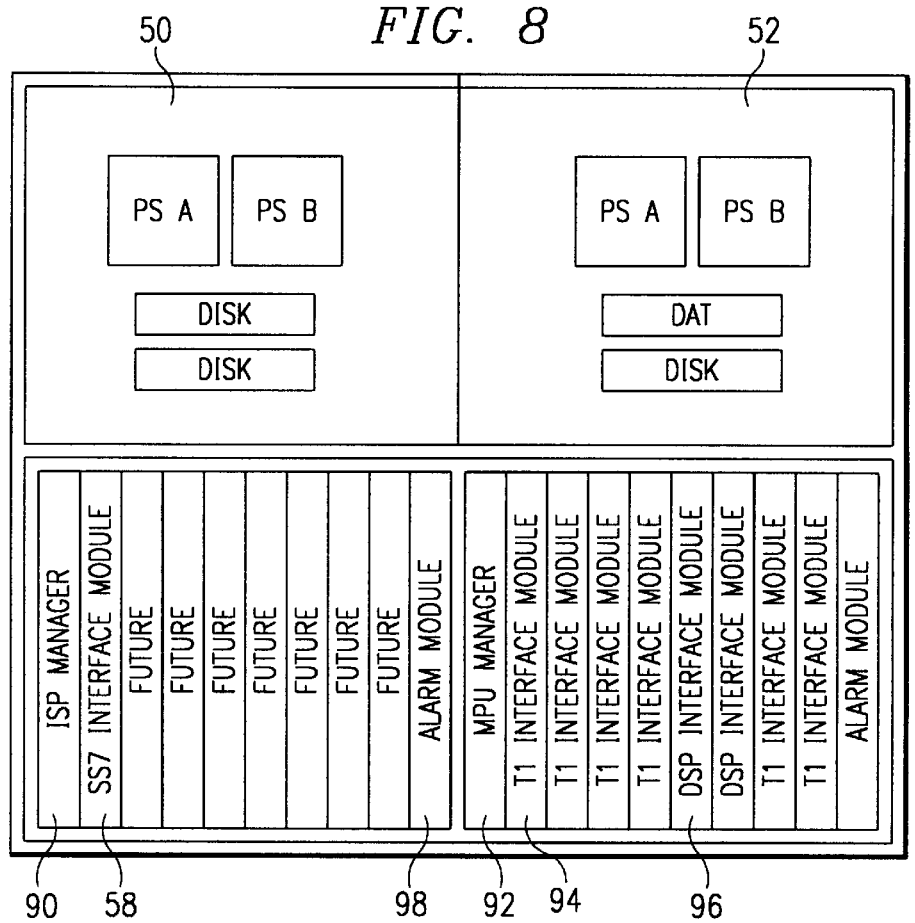
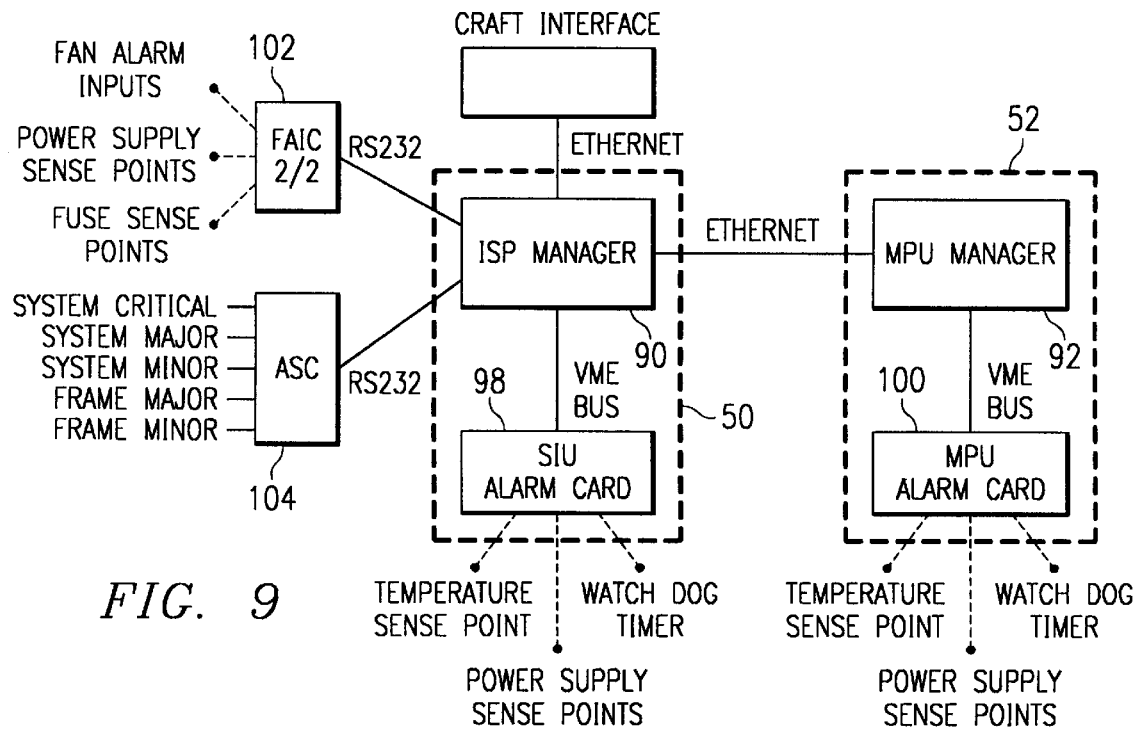

INTELLIGENT SERVICE PERIPHERAL DEVICE

RELATED APPLICATIONS

The present application claims benefit to U.S. Provisional application Ser. No. 60/036,705 filed Jan. 31, 1997.

TECHNICAL FIELD OF THE INVENTION

The present invention relates in general to telecommunication network implementations and more particularly to an intelligent service peripheral device.

BACKGROUND OF THE INVENTION

A service switching point requires an embedded call model before it can participate in advanced intelligent network services. Large network operators may be required to upgrade their switches with standards based advanced intelligent network (AIN) call models. The messages used for queries and corresponding responses between a service switching point and a service control point typically use the TCAP layer of the SS7 stack. However, the software upgrade required for installing the appropriate call model on the existing switches can be prohibitively expensive, time consuming, and in some cases not feasible. Therefore, it is desirable to be able to add call models to existing service switching points in an economical and timely manner.

SUMMARY OF THE INVENTION

From the foregoing, it may be appreciated that a need has arisen for a centralized network element that contains call models that can be shared across the network of switches. In accordance with the present invention, an intelligent service peripheral device is provided that substantially eliminates or reduces disadvantages and problems associated with conventional call model upgrades within switches.

According to an embodiment of the present invention, there is provided an intelligent service peripheral device that includes a service intelligence unit and a media processing unit. The service intelligence unit includes a service processor manager module and a signaling module. The signaling module receives a service request associated with a call from a service switching point. The service processor manager module processes the service request and determines a routing package that is transferred to the service switching point through the signaling module in order to complete connection of the call it its intended destination. For service requests that require special feature handling, the service processor manager module passes the service request to a media processor manager module within the media processing unit. The media processor manager module processes the service request and connects the call to a carrier interface module. The carrier interface module provides various basic features capable of exchanging information with an originator of the call. For enhanced features, the carrier interface module interfaces with a resource module in order to provide various enhanced features for the call capable of exchanging information with the originator of the call and not supported by the carrier interface module. The media processor manager module determines a route package for the call in response to execution of the features provided by the carrier interface module and the resource module. The media processing unit provides the routing package to the service intelligence unit for appropriate transmission to the service switching point in order to complete connection of the call to its desired destination.

The present invention provides various technical advantages over conventional call model processing. For example, one technical advantage is to provide a centralized network element that contains call models to be shared among various switches within the network. Another technical advantage is to provide an easy capability to upgrade the network element without upgrading the switches within the network or affecting switch operation. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 8 illustrates a physical layout of the intelligent service peripheral device;

FIG. 9 illustrates a block diagram of interface cards within the intelligent service peripheral device;

DETAILED DESCRIPTION OF THE INVENTION

Figure 1:
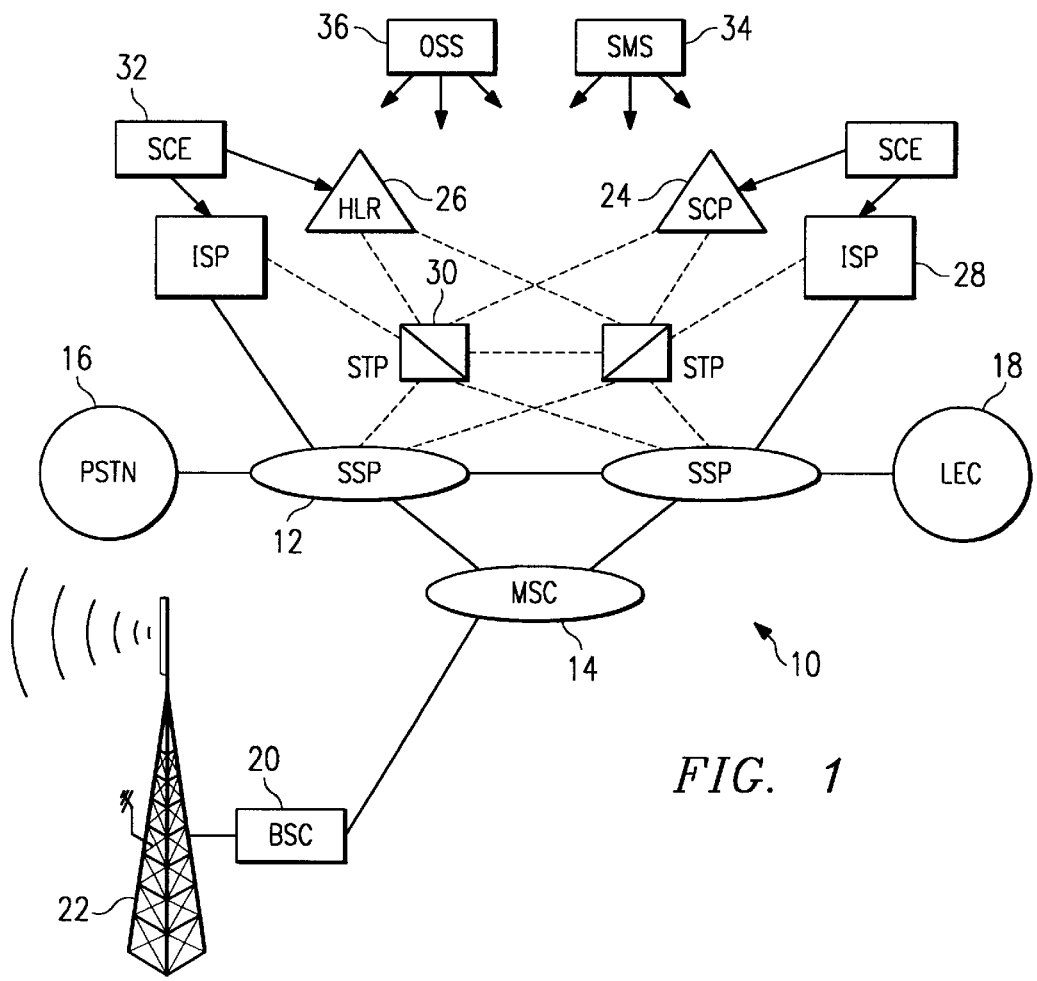
FIG. 1 illustrates a block diagram of a telecommunications network.

FIG. 1 is a block diagram of an advanced intelligent network 10. Advanced intelligent network 10 includes a service switching point 12 and a mobile switching center 14 that provide delivery functions in order to transport telecommunication signals within advanced intelligent network 10. Service switching point 12 is a network switch that routes telecommunications traffic to and from other network elements such as a public switch telephone network 16 and a local exchange carrier 18. Mobile switching center 14 is a network switch used in a wireless network that routes telecommunications traffic to a base switching center 20 for transmission by an antenna 22. Service switching point 12 and mobile switching center 14 provide the interface to the end user and can recognize when telecommunication traffic requires advanced intelligent network involvement. The service delivery functions provided by service switching point 12 and mobile switching center 14 are managed by a service control point 24, a home location register 26, and an intelligent service peripheral device 28. Advanced intelligent network 10 uses the signaling system 7 (SS7) protocol for interaction between the service delivery functions of service switching point 12 and mobile switching center 14 and the service control functions provided by service control point 24, home location register 26, and intelligent service peripheral device 28. A signal transfer point 30 is a packet switch used to facilitate routing of SS7 packets between various signaling entities within advanced intelligent network 10.

When conditions for advanced intelligent network service logic involvement are met, service switching point 12 sends an SS7 message to service intelligence within intelligent service peripheral device 28. Service switching point 12 participates in a dialog with the service intelligence such that the service intelligence guides the service switching point 12 for subsequent handling of the advanced intelligent network call. In order to provide these functions, service switching point 12 must support a call model which includes trigger points at appropriate points in call (PIC) and detection points (DP). These trigger points provide opportunities where decisions can be taken to seek assistance from the service intelligence. Call models are defined in respective standards documents from Bellcore, ITU, and ETSI.

Before a new service is deployed in the advanced intelligent network environment, a service description is created which describes how the given service should work. The service is then designed and simulated with the help of a service creation environment 32. Service creation environment 32 uses software independent building blocks (SIBEs) to create a service logic program (SLP) associated with the service. Once the service logic is verified, the executable code associated with the service logic program is downloaded to the associated service control elements, i.e. service control point 24, home location register 26, and intelligent service peripheral device 28. A service management system (SMS) 34 provides the necessary operation support functions to provision, maintain, and administer the service. A back office operating support system (OSS) 36 provides the necessary network management and billing functions.

Intelligent service peripheral device 28 contains functionality and resources capable of exchanging information with the end user. For example, it can play voice announcements and collect DTMF digits. Within the context of an advanced intelligent network call, intelligent service peripheral device 28 may perform or be instructed to perform a particular function. For example, intelligent service peripheral device 28 can support applications requiring speech recognition, text to speech conversion, and facsimile processing, as well as various other types of applications. The interface between intelligent service peripheral device 28 and service switching point 12 is typically based on ISDN PRI protocols. Service logic programs that execute on intelligent service peripheral device 28 use the same software independent building blocks that are used within service control point 24 and home location register 26. This commonality of logic across multiple platforms leads to a synergistic environment for the introduction of advanced intelligent network based services for both the wireline and the wireless networks.

Figure 2:
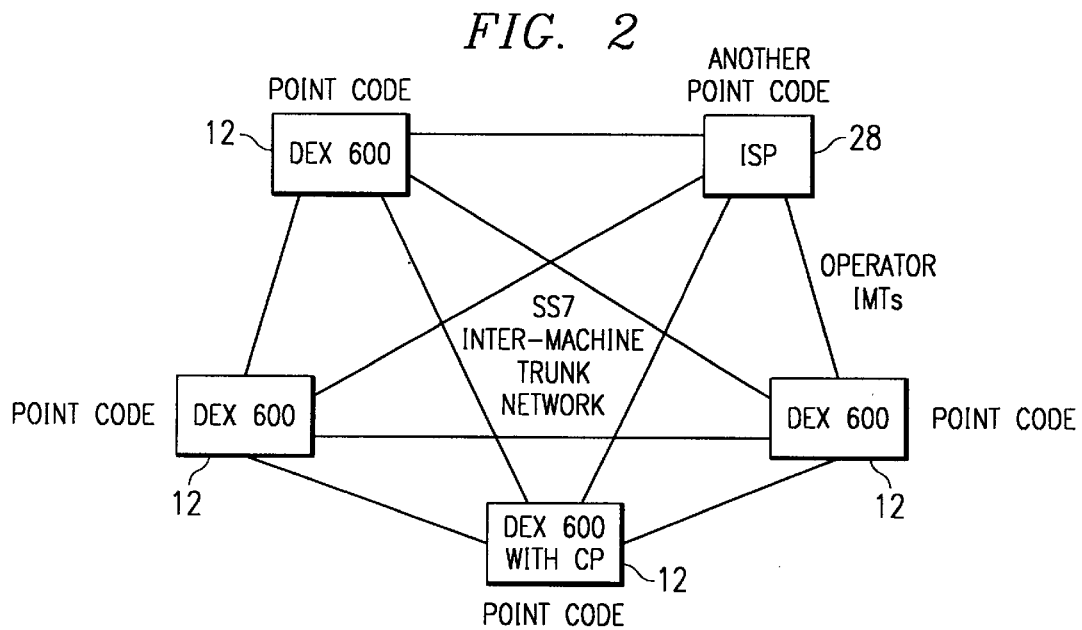
FIG. 2 illustrates a block diagram of a trunking network within the telecommunications network.

Service switching points 12 typically use the ISUP layer of the SS7 stack for interswitch connection control. Each service switching point 12 in a network is assigned a point code. The ISUP based connection control messages are routed between switches on the basis of these point codes. Intelligent service peripheral device 28 is designed to appear as another point code in the signaling network. This allows service switching point 12 to communicate with intelligent service peripheral device 28 using the standard ISUP messages. Intelligent service peripheral device 28 is designed to serve as an outboard system in order to provide the requisite intelligence in a centralized manner so that the intelligence can be shared across a network of service switching points 12. FIG. 2 shows how intelligent service peripheral device 28 connects to a network of service switching points 12.

Figure 3:
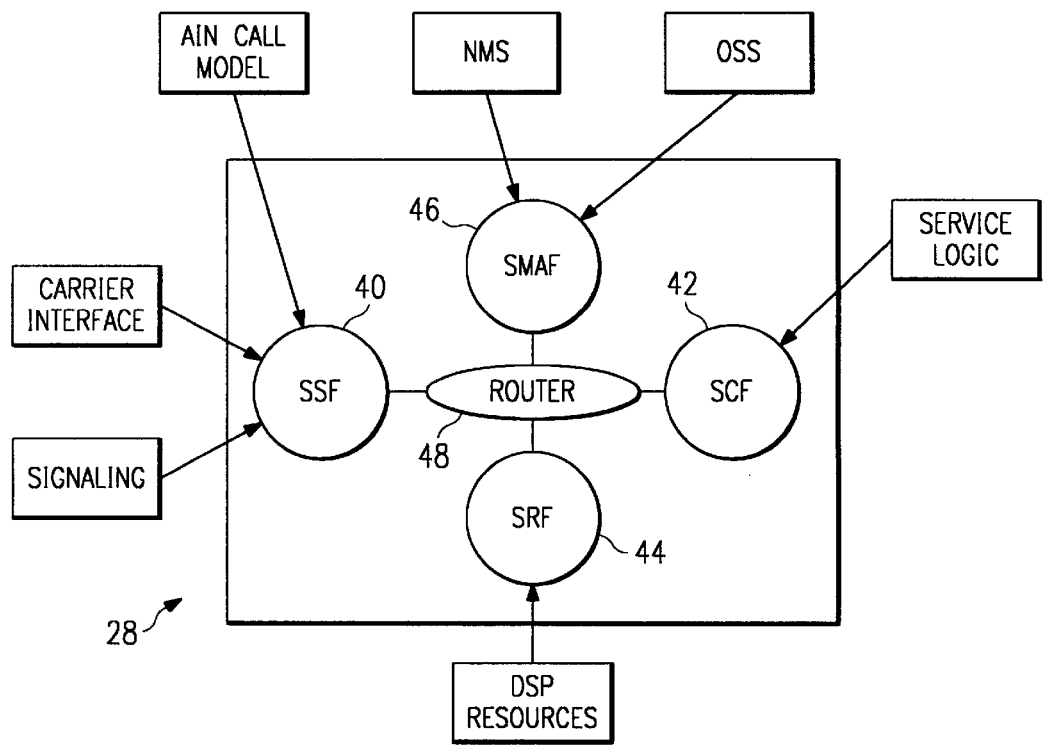
FIG. 3 illustrates a functional block diagram of an intelligent service peripheral device within the telecommunications network.

FIG. 3 shows a functional view of intelligent service peripheral device 28. Intelligent service peripheral device 28 includes a service switch function 40, a service control function 42, a service resources function 44, and a service management and application function 46, all coupled to each other by a router 48. Service switching function 40 provides a termination point for the SS7 intermachine trunks (IMT) and also provides an ETSI INAP based call model. The bearer path is based on T1/E1 carriers. Service switching function 40 terminates the incoming ISUP messages and, if necessary for a given service, launches TCAP based queries for the INAP base call model towards the internal service control function 42. Service control function 42 provides service logic interpretation for executing the services of intelligent service peripheral device 28. The service logic programs are created by service creation environment 32 and downloaded to service control function 42. The service logic programs are built using INAP compliant service independent building blocks. Service resource function 44 provides digital signal processing based resources for implementing services requiring DTMF digit collection, speech recognition, facsimile processing, text to speech conversion, multiparty conference bridging, as well as other types of service capabilities. Service management and application function 46 provides the overall platform management functions of intelligent service peripheral device 28. These functions include configuration, performance, fault, security, and account management capabilities. Service management and application function 46 also provides necessary interfaces for external operational support systems.

Intelligent service peripheral device 28 provides an integrated environment that can support database look-ups (a typical service control point function), advance voice processing base functions (a typical intelligent peripheral function), and services that require interaction between the two functions. Also, due to the ISUP messaging capability, intelligent service peripheral device 28 has access to connection parameters such as ANI, DNS, among other parameters associated with a call. This information when used in conjunction with service control point and intelligent peripheral functions allows intelligent service peripheral device 28 to provide service extensions to services currently offered by existing switches.

Consequently, services that can be supported by intelligent service peripheral device 28 can be classified into the following three categories—category A service control point base services, category B service control point and intelligent peripheral base services, and category C switch service extensions. For a typical service belonging to any of the above categories, the service design begins on service creation environment 32. The process of service creation through service creation environment 32 and deployment via intelligent service peripheral device 28 will be described below. A representative list of services that can be supported by intelligent service peripheral device 28 in category A include SAC (N00/888) translation, virtual private network, 900 premium rate, and follow me services. A representative list of services that can be supported by intelligent service peripheral device 28 in category B include interactive voice response, voice activated dialing, multiparty conferencing, and calling card services. A representative list of services that can be supported by intelligent service peripheral device 28 in category C include SAC (N00/888) translation with personal identification number, account code validation, advance network intelligent specific routing, and alternate destination routing services.

Figure 4:
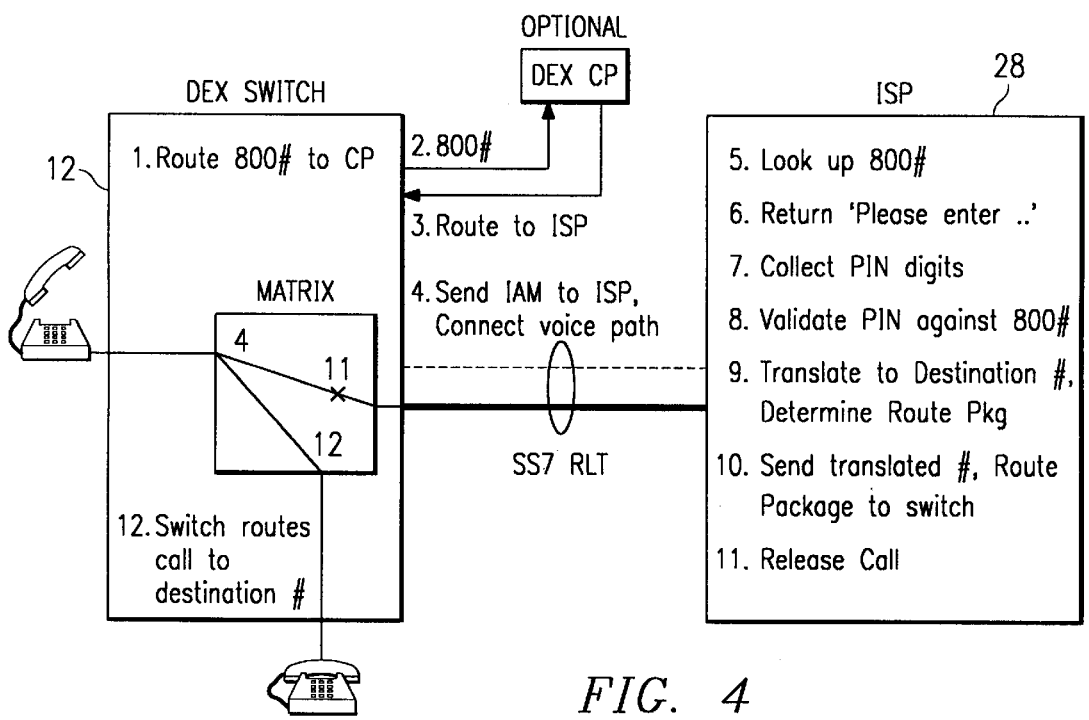
FIG. 4 illustrates an example of a call processed through the intelligent service peripheral device.

FIG. 4 is a block diagram showing the processing of a call for the SAC (N00/888) translation with personal identification number service. This service allows a connection to be made to a predefined destination number which is associated with a 800/888 number and given a personal identification number. With this service, an end user can reach the predefined destination number from any telephone from which the toll free number can be called and get the call billed to the subscriber's ANI. Since the destination is predefined, telephone fraud is minimized. To implement this service, a database in service switching point 12 is set up to send an ISUP message to the destination point code of intelligent service peripheral device 28 over an operator IMT when it receives a toll free call. Included in the ISUP IAM message are parameters such as the ANI, the toll free number, the personal identification number, as well as other service parameters. The call model in service switching function 40 of intelligent service peripheral device 28 then launches a query to switching control function 42. Switching control function 42 performs the toll free number translation, commands service resource function 44 to prompt and collect a personal identification number, validates the personal identification number against the collected personal identification number, and finally returns the destination number and the routing package to service switching function 40. Service switching function 40 forwards the information to service switching point 12 via a return IAM. At this point, intelligent service peripheral device 28 releases the call to service switching point 12 and releases the voice trunk. Service switching point 12 then routes the call to the intended destination and follows up with the remaining call processing functions associated with the call.

Figure 5:
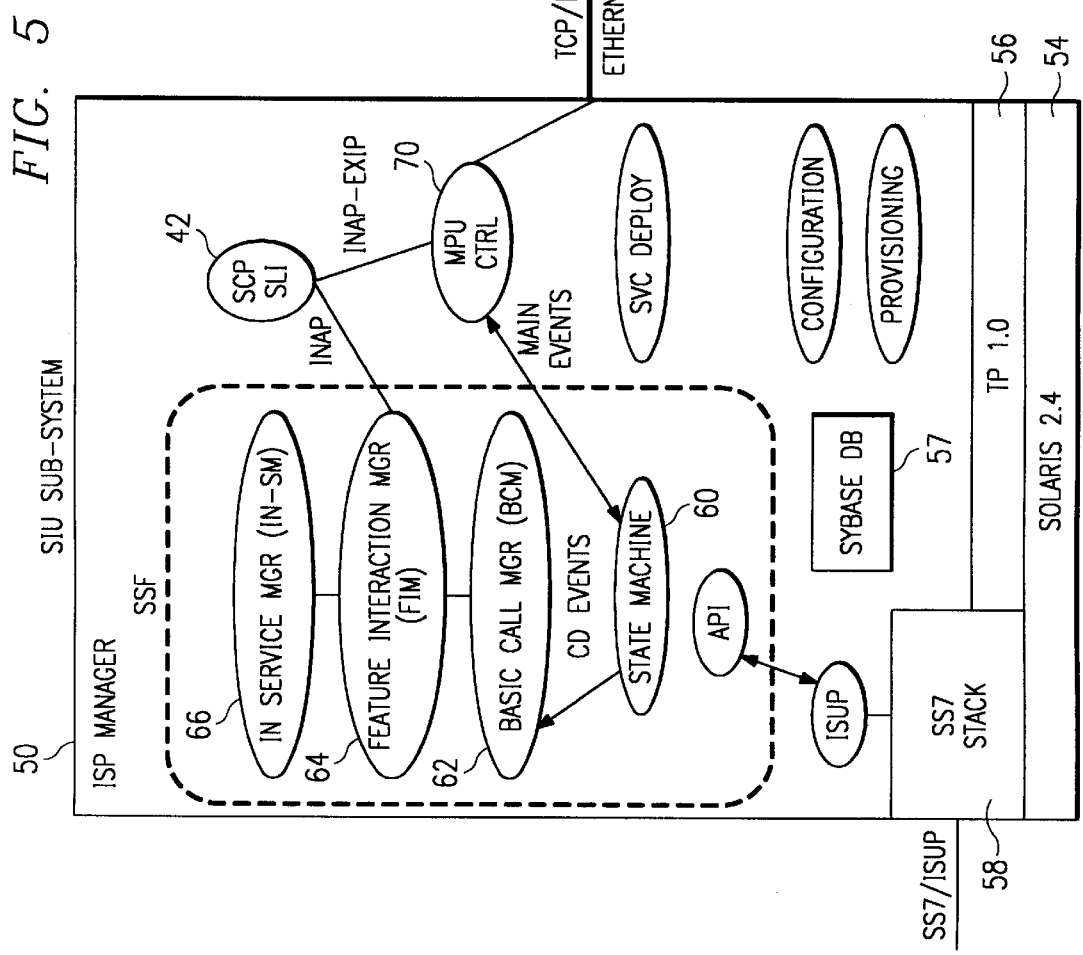
FIG. 5 illustrates a block diagram of the software architecture for the intelligent service peripheral device.

FIG. 5 is a block diagram of the software architecture for intelligent service peripheral device 28. The software for intelligent service peripheral device 28 is architected in a layered manner. The software is functionally distributed between two subsystems, a service intelligent unit subsystem 50 and a media processing unit subsystem 52. Each subsystem is managed by a respective processor card. The processor in the service intelligent unit subsystem is referred to as the intelligent service peripheral manager. The processor on the media processing unit subsystem is referred to as the media processing unit manager. Preferably, both of the processor cards are based on SUN Microsystem's Sparc family of processors and operate under the Solaris 2.4 operating system 54. The layer next to the operating system is called telephone platform 1.0 56. This layer provides software infrastructure which is common across advanced intelligent network products. This infrastructure includes platform management support, service management support, message handling support, distributed object message environment support, data collection support, and common utility support. The intelligent service peripheral manager processor preferably uses a SYBASE database 57 for storage and retrieval of various call associated parameters.

Service switching function 40 receives an ISUP service request message from an SS7 interface 58 and controls the call processing messaging between service switching function 40, service control function 42, media processing unit 52, and the ISUP SS7 response interface 58 to the originating point code service switching point 12. Service switching function 40 includes a state machine 60, a basic call manager 62, a feature integration manager 64, and an intelligent network service manager 66. State machine 60, basic call manager 62, feature interaction manager 64, and intelligent network service manager 66 are treated as a single entity under service switching function 40. State machine 60 processes service requests and tracks the state transitions for service requests as it is processed by various components of intelligent service peripheral device 28. State machine 60 assigns a transaction identification to the service request and saves any information needed to process the request in a call control instance register. Basic call manager 62 provides the call model for the protocol associated with each service request message. Feature integration manager 64 determines which service control function 42 features are associated with each service request. Intelligent network service manager 66 routes service requests to service control function 42 and the media processing unit manager processor card.

Service switching function 40 interface to service control function 42 uses the INAP messages encapsulated in the TCAP layer of SS7 interface 58. The TCAP layer messages are further encapsulated in TCP/IP frames. This provides a migration path for supporting INAP messages over an external standard TCAP/SS7 interface. Intelligent network service manager 66 of service switching function 40 is used for managing the interaction with service control function 42. It uses the INAP TCAP library for generating service switching function 40 to service control function 42 requests and to decode the replies from service control function 42 to service switching function 40. The interface between service control function 42 and a media processing unit controller 70 is based on standard INAP protocol. Media processing unit controller 70 starts a dialog with service control function 42 by sending an assist request instruction message. Service control function 42 then sends either a play announcement or a prompt and collect message. Media processing unit controller 70 provides the conversion between the incoming CIC codes from the ISUP IAM message with the appropriate span and circuit numbers. It maintains a database for the current status of the trunk lines and also interacts with the process running on the media processing unit processor.

Media processing unit subsystem 52 consists of a process called media process 72 per trunk group. Distributed object message environment is used between media processor 72 and media processing unit controller 70. Upon receiving a message from media processing unit controller 70, media process 72 will process it and send back the appropriate response. An announcement database resides on media processing unit subsystem 52. The announcement database consists of a collection of UNIX files and a control file which is used to keep track of the announcements and the associated parameters. A digital speech recorder is used to create high quality digital announcements. The announcements are stored using mulaw PCM sample at 8 KHz rate. Media processing unit 52 also includes T1/E1 carrier interface modules and digital signal processor resource modules connected by an SC bus under the control of an SC bus manager 73 and channel allocators 74.

Figure 6:
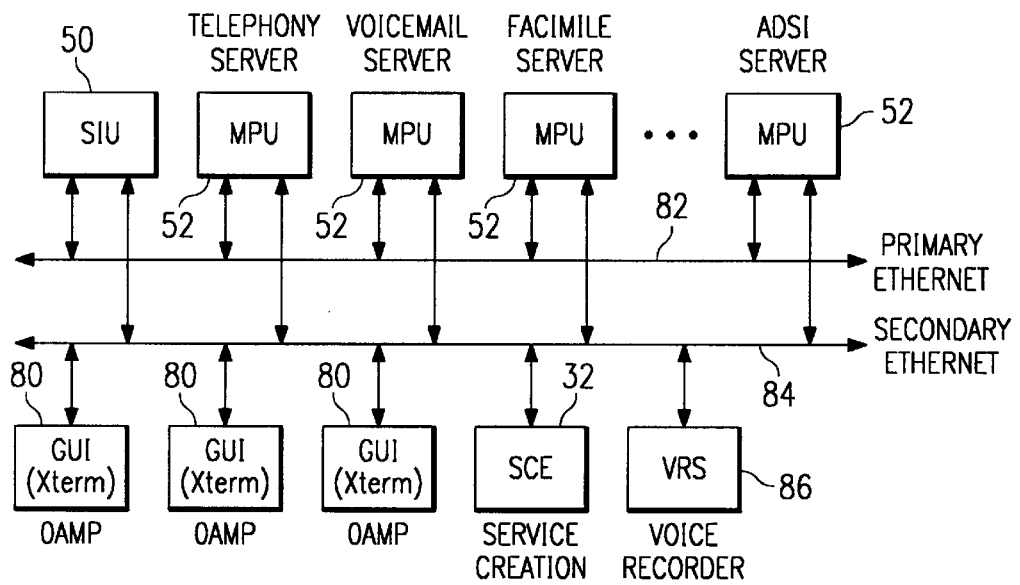
FIG. 6 illustrates a block diagram of the intelligent service peripheral device.

FIG. 6 shows a functional hardware architecture of intelligent service peripheral device 28. Intelligent service peripheral device 28 is made up of two main functional entities, service intelligent unit 50 and one or more media processing units 52. Service intelligent unit 50 provides the call model and service control function 42 and media processing units 52 provide the trunk interface and digital signal processing functions to support a variety of applications. Applications provided by media processing units 52 include a telephony server, a voice mail server, a facsimile server, and an analog display service interface server. The telephony server provides capability to support basic IVR functions. These include capabilities such as playing voice announcements, DTMF digit collection, tone generation, silence detection, call progress monitoring, as well as other capabilities. The telephony server will also provide functions such as automatic speech recognition, text to speech conversion, and multiparty conferencing. The voice mail server allows users to store and retrieve voice messages from their individual mail boxes. Adaptive differential pulse code modulation is used for voice compression in optimizing this space. Automatic gain control is used for compensating variations in the levels of the incoming audio signal. The facsimile server allows enhanced fax services such as fax broadcasting, fax on demand, fax mail boxes, as well as other services. The facsimile server in conjunction with the IVR functions provided by the telephony server provide a user friendly environment for supporting fax services. The fax broadcast capability is used by service bureaus who send the same message to a large number of fax machines. Fax mail boxes allow users to receive information via faxes. The analog display service interface server allows for interface digital information to be sent to telephones over existing analog local loops. The analog display service interface server provides the capability to store and retrieve ASCII text messages which can be displayed on compliant telephones in response to end user signaling. This capability can be used to receive information such as weather reports, stock quotes, and other types of data.

The list of possible media processing units 52 mentioned above is not definitive. Intelligent service peripheral device 28 architecture provides the flexibility to integrate one or more of the functions mentioned above on an as needed basis. Seamless interaction between service intelligent unit 50 and the various media processing units 52 allow services to benefit from capabilities supported by individual servers. For example, the automatic speech recognition capability of the telephony server can be used in conjunction with the voice mail server to allow a subscriber to pick up messages based on spoken commands. Service intelligent unit 50 can forward calls to the voice mail server or to a voice announcement provided by the telephony server based on the time of day, day of the week, or as otherwise desired.

Intelligent service peripheral device 28 may be equipped with one or more graphical user interface based craft terminals 80. These terminals are used for local operations, administration, maintenance, and provisioning functions. The interface between graphical user interface craft terminals 80 and service intelligent unit 50 is based on TCP/IP over either a primary ethernet 82 or secondary ethernet 84. Intelligent service peripheral device 28 utilizes a service creation environment 32 for service creation. Services created by service creation environment 32 can be downloaded to service intelligent unit 50 over either primary ethernet 82 or secondary ethernet 84. Intelligent service peripheral device 28 utilizes a voice recorder system 86 for creating voice announcements. Preferably, an 8 kilobyte per second sampling clock and mulaw encoding for creating pulse code modulation samples are used. The samples are stored in UNIX based files which can be loaded to the database of the telephony server.

Figure 7:
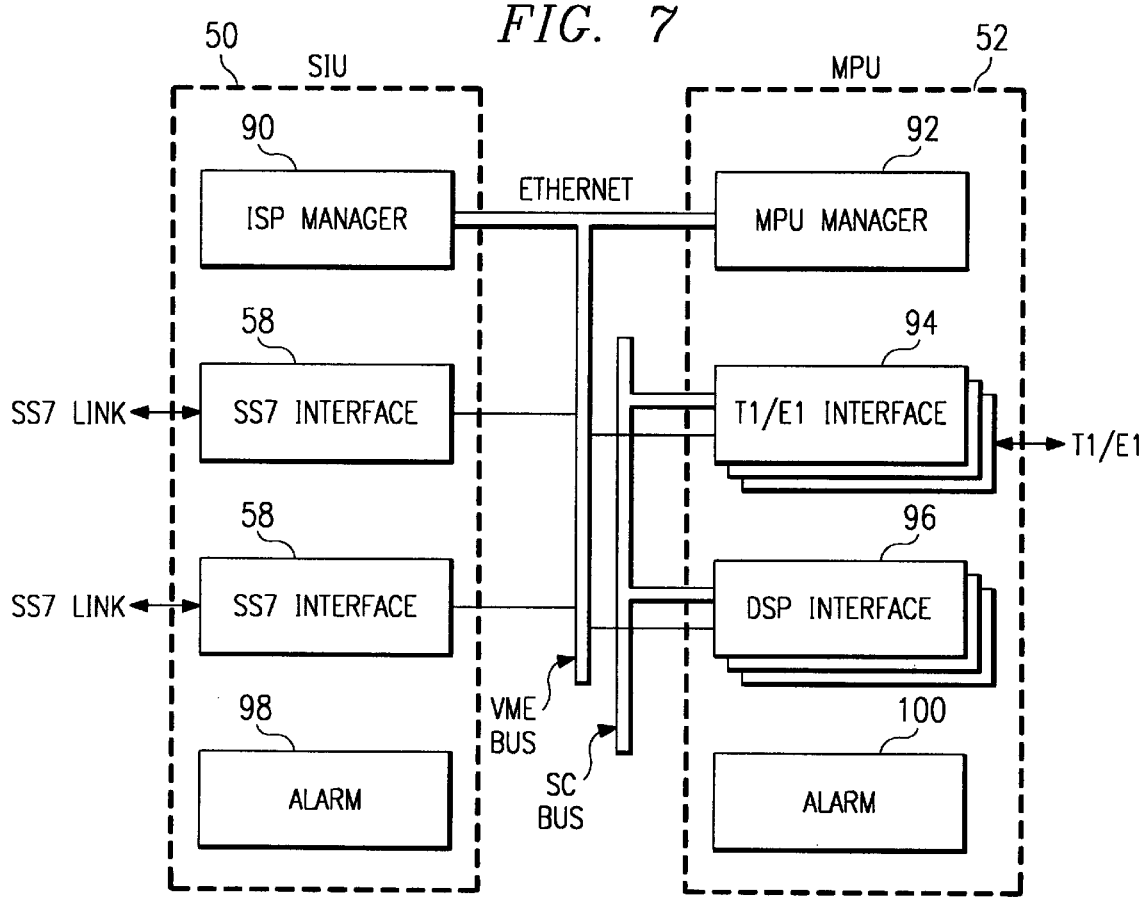
FIG. 7 illustrates a block diagram of a service intelligence unit and a media processing unit within the intelligent service peripheral device.

FIG. 7 shows the connectivity between the intelligent service peripheral manager processor 90 of service intelligent unit 50, media processing unit manager 92 on media processing unit 52, and their subordinate modules. Service intelligent unit 50 contains SS7 based signaling links. Each service intelligent unit 50 is equipped with at least one SS7 module 58 with two SS7 links. Additional SS7 modules 58 can be added to service intelligent unit 50 to support larger intelligent service peripheral device 28 systems. SS7 module 58 and intelligent service peripheral manager 90 communicate preferably via a computer address, data, and control bus standard known as VersaModule Europe. Functionally, service intelligent unit 50 is responsible for receiving the incoming ISUP signaling messages over SS7 links, converting them into INAP based query messages, forwarding the messages to the internal service control function 42 for database look-up, retrieving the information from service control function 42, and sending that information back via the outgoing ISUP message.

If a particular application requires the use of special resources such as DTMF digit collection, voice recognition, etc., then the services of a media processing unit 52 are utilized. Media processing unit 52 contains T1 carrier interface modules 94 and generic digital signal processing based resource modules 96. These modules are preferably interconnected via an industry standard bi-directional 2,048 time slot time division multiplex SC bus. The SC bus is a full duplex time division multiplex bus which can provide connectivity between 2,048 DS0 timeslots. In a typical application, for example one requiring voice recognition, an inbound DS0 on the T1 carrier 94 carrying PCM samples is routed to the resource module 96 via the SC bus. The resource module 96 uses DSP based algorithms to determine the ASCII text associated with the spoken word. The ASCII text is then forwarded to media processing unit manager 92 via the VersaModule Europe bus. Service intelligence unit 50 and media processing unit 52 include an alarm module 98 and an alarm module 100, respectively, to detect various improper operating conditions.

FIG. 8 shows a block diagram of the physical layout for intelligent service peripheral device 28. The physical layout for intelligent service peripheral device 28 provides a split VersaModule Europe based backplane in order to have two independent ten slot shelves in one unit, one shelf housing service intelligent unit 50 and the other shelf housing media processing unit 52. Both service intelligent unit 50 and media processing unit 52 have their own redundant power supplies PS A and PS B. Service intelligent unit 50 preferably contains two four gigabyte hard disks, an intelligent service peripheral manager module 90, one or more SS7 modules 58, and one alarm module 98. Other slots within service intelligent unit 50 are reserved for future enhancements. Media processing unit 52 preferably contains one four gigabyte hard disk, one four millimeter eight gigabyte digital audio tape drive, media processing unit manager module 92, T1 carrier interface modules 94, digital signal processing special resource modules 96, and an alarm module 100.

Intelligent service peripheral manager module 90 within service intelligent unit 50 is preferably based on a general purpose high performance processor module. The microprocessor used is. preferably a microSPARC-2 operating at 110 MHz and running SUN Microsystems Solaris 2.4 UNIX operating system. Intelligent service peripheral manager module 90 provides high speed access to shared memory having 128 megabytes of dynamic random access memory. Two S bus expansion card slots are provided and the processor communicates with its subtending SS7 module 58 and alarm module 98 via the VersaModule Europe bus. Intelligent service peripheral manager 90 provides a dual SCSI interface, a dual ethernet interface, and a dual serial interface.

For the dual SCSI interface, interface service peripheral manager module 90 provides two SCSI ports, port A and port B that support direct memory addressing. Port A may be accessed from two separate connectors, one mounted on the front of the chassis and the other mounted at the rear of the chassis containing intelligent service peripheral device 28. Preferably only one connector is in use at any given time. In a typical configuration, the rear connector would be connected to hard disk A. The front connector may be used to install systems software on the hard disk from an external CD ROM. Port B may be accessed preferably from the rear of the chassis. In a typical configuration, port B is connected to hard disk B of service intelligent unit 50.

For the dual ethernet interface, intelligent service peripheral manager module 90 provides two independent ethernet interfaces operating at ten megabytes per second. Both interfaces preferably utilize 10baseT twisted pair cable and an RJ-45 connector. As previously discussed, the two independent ethernet interfaces are coupled to a primary ethernet 82 and a secondary ethernet 84, respectively. Primary ethernet 82 is used for communication between intelligent service peripheral manager 90 and one or more media processing unit managers 92 on media processing units 52. Depending upon the system size, a passive ethernet hub may be used to interconnect intelligent service peripheral manager module 90 and the multiple media processing unit manager modules 92. Secondary ethernet 84 is used as a backup in the event of failure of primary ethernet 82. Secondary ethernet 84 may also be used to connect to an x-terminal craft interface. Depending upon the system size and the number of craft terminals required, a passive ethernet hub may be used to interconnect multiple x-terminals with intelligent service peripheral manager module 90.

For the dual serial interface, intelligent service peripheral manager module 90 provides two RS-232 serial input/output ports. These ports are designated as port 1 and port 2 and preferably use a 25 pin D type female connector. Port 1 is used to connect to a frame alarm interface card that monitors frame alarm such as those associated with power supply feeds and cooling. Port 2 is used to connect to an alarm system controller card that controls the frame alarm light emitting diodes and an audio alarm buzzer. Port 2 may also be used to attach to a VT220 terminal for diagnostic purposes.

SS7 interface module 58 preferably provides 256 kilobyte per second SS7 links. Each link supports a V.35 male connector. In a typical network, the two SS7 links are connected to a mated pair of signal transfer points 30 and are diversely routed. Each link is configured for 0.4 erlangs of traffic. In case of a link failure, the surviving link can carry the traffic associated with the failed link. Additional SS7 interface modules 58 can be added to service intelligent unit 50 to support larger system sizes. Engineering rules are used to determine the required number of SS7 links.

Alarm module 98 is connected to intelligent service peripheral manager module 90 via the VersaModule Europe bus. Alarm module 98 provides sixteen user defined LEDs, one 16 bit status register, one 16 bit control register, a watch dog timer, temperature sensor, voltage monitoring circuit, and two dry relay contacts. Upon detection of a failure condition, detected either by alarm module 98 or by other modules within intelligent service peripheral device 28, intelligent service peripheral manager module 90 can indicate the failure condition by turning on the appropriate LED on alarm module 98 and issuing an information problem report if necessary.

Media processing unit manager module 92 is based on the same processor module as intelligent service peripheral manager module 90 on service intelligent unit 50. Media processing unit manager module 92 provides a dual SCSI interface, a dual ethernet interface, and a dual serial interface. These input/output interfaces supported by media processing unit manager module 92 are similar to the input/output interfaces provided by intelligent service peripheral manager 90.

For the dual SCSI interface, media processing unit manager module 92 provides two SCSI ports, port A and port B, that support direct memory addressing. Port A may be accessed from two separate connectors, one mounted on the front of the chassis and the other mounted at the rear of the chassis of intelligent service peripheral device 28. Preferably only one connector is in use at any given time. In a typical configuration, the rear connector will be connected to hard disk A of media processing unit 52. The front connector may be used to install system software on the hard disk from an external CD ROM. Port B may be accessed from the rear of the chassis. In a typical configuration, port B may be connected to the digital audio tape drive.

For the dual ethernet interface, media processing unit manager module 92 has two ethernet interfaces connected to corresponding interfaces on intelligent service peripheral manager module 90 via ethernet hubs if necessary as previously discussed.

For the dual serial interface, media processing unit manager module 92 provides two RS-232 serial input/output ports. The ports are designated as port 1 and port 2 and may use a 25 pin D-type female connector. Port 1 may be used to provide an SNMP base remote operation support interface. Port 2 may be used to connect to a VT220 terminal for diagnostic purposes.

Media processing unit 52 may support eight T1 carrier interfaces 94. This provides growth of the port capacity in 24 port increments up to 192 ports. T1 carrier interfaces 94 may be accessed from the rear of the chassis. T1 carrier interface 94 provide a DSX-1 compatible T1 signal and can be optioned for B8ZS or bit 7 ZCS for maintaining ones density. The physical connector is preferably an 8 pin RJ48-C connector. T1 carrier interface 94 supports numerous features including DTMF detection, automatic gain control, voice detection, fax/modem detection, answering machine detection, speed and volume control, analog display services interface, and tone detection and generation. Through T1 carrier interface 94, media processing unit 52 can support basic IVR based applications without requiring the use of digital signal processing resource modules 96. T1 carrier interface 94 may be used as a normal T1 trunk between service switching points 12 or as an ISDN PRI (23 B+D) based trunk. T1 carrier interface 94 provides software API to support Q.931 base signaling over the D channel.

Each digital signal processing interface 96 within media processing unit 52 supports four independent digital signal processing functional blocks. Each functional block preferably uses a TMS320C31 floating point digital signal processor running at 50 MHz. Each functional block can also be used to provide a different application simultaneously. The number of ports which can provide a particular application depends upon the complexity of the digital signal processing algorithm. For example, each TMS320C31 can support speaker independent speech recognition on two DS0 ports simultaneously. Consequently, one digital signal processor interface 96 can support speech recognition on eight DS0 ports. The number of digital signal processing resource modules 96 is based on the number of ports that require specialized processing. Digital signal processing resource modules 96 may be programmed to support speaker independent speech recognition, speaker dependent speech recognition, speaker verification, text to speech conversion, multiparty audio bridging, voice compression, and fax storage and retrieval. Additional capabilities may be added as newer digital signal processing algorithms are developed.

FIG. 9 shows the connection of the frame alarm interface card 102 and the alarm system controller card 104 to intelligent service peripheral manager module 90 of service intelligent unit 50 within intelligent service peripheral device 28. Frame alarm interface card 102 monitors the frame alarms and reports them to intelligent service peripheral manager module 90 via its RS-232 interface. Alarm system controller card 104 controls the five alarm LEDs and an audio buzzer mounted on the door of the chassis of intelligent service peripheral device 28. Alarm system controller card 104 communicates with intelligent service peripheral manager module 90 via its RS-232 interface. The LEDs provided by alarm system controller card 104 are used to indicate frame and system failures.

The digital audio tape drive of media processing unit 52 uses four millimeter digital audio tape with an eight megabyte capacity. The digital audio tape drive is used for backing up media processing unit software and databases, including digitized voice prompts. The digital audio tape drive may also be used for infield software upgrades.

Figure 10:
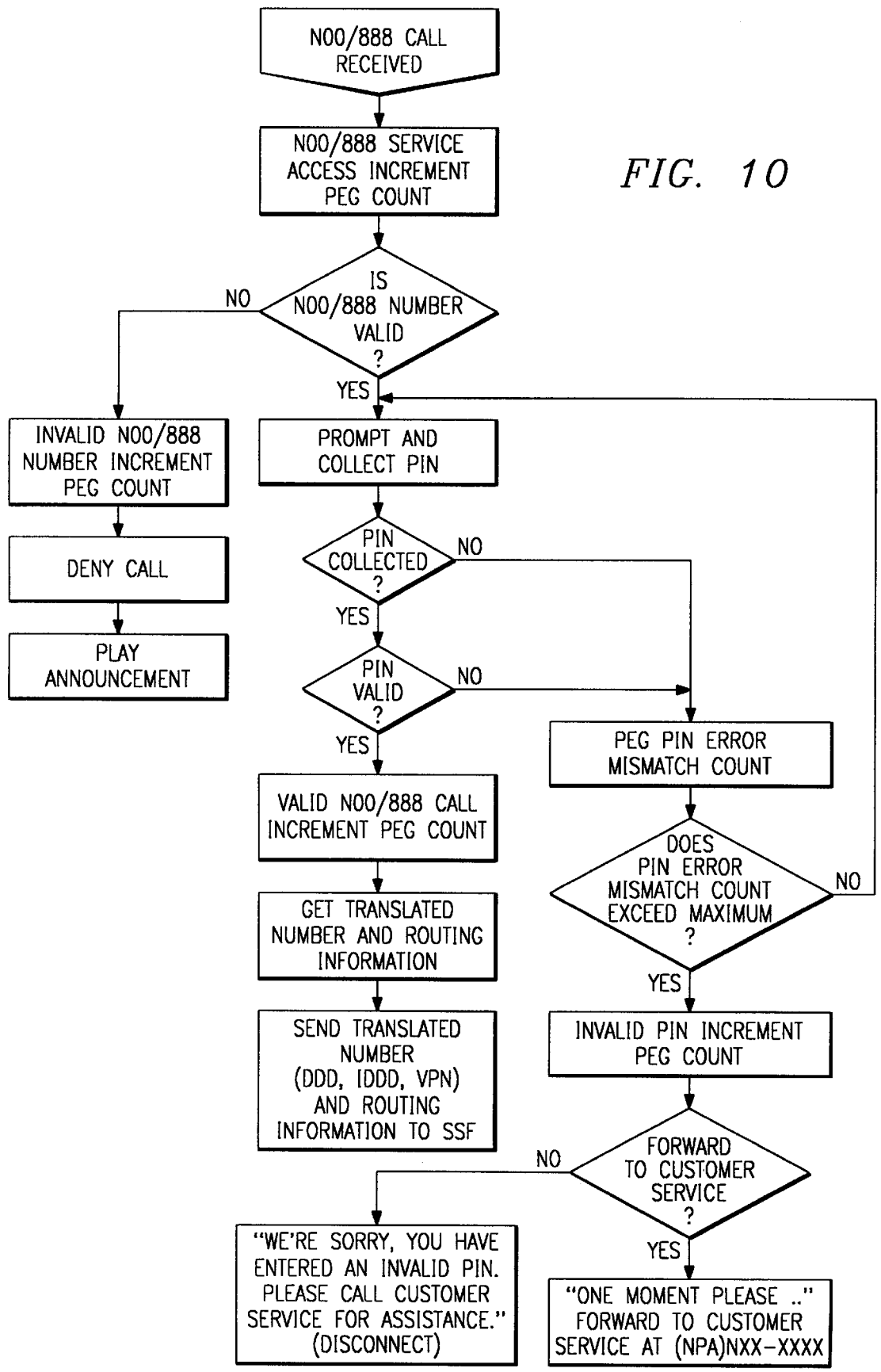
FIG. 10 illustrates a process flow for a particular call within the intelligent service peripheral device.

FIG. 10 shows an example of the service logic for the SAC (N00/888) translation with personal identification number service. In order to create and deploy a new service, process begins with the service definition. The service definition is documented in a service description specification document. Service creation environment 32 is then used to develop a service logic program which is based on the service logic in the service description specification. The service logic program is built using service independent building blocks from service creation environments 32 standard service independent building block library. Additional service independent building blocks may be created if necessary. The executable code associated with the service logic program is downloaded to intelligent service peripheral manager module 90 via secondary ethernet 84 connected to port B on intelligent service peripheral manager module 90.

Figure 11A:
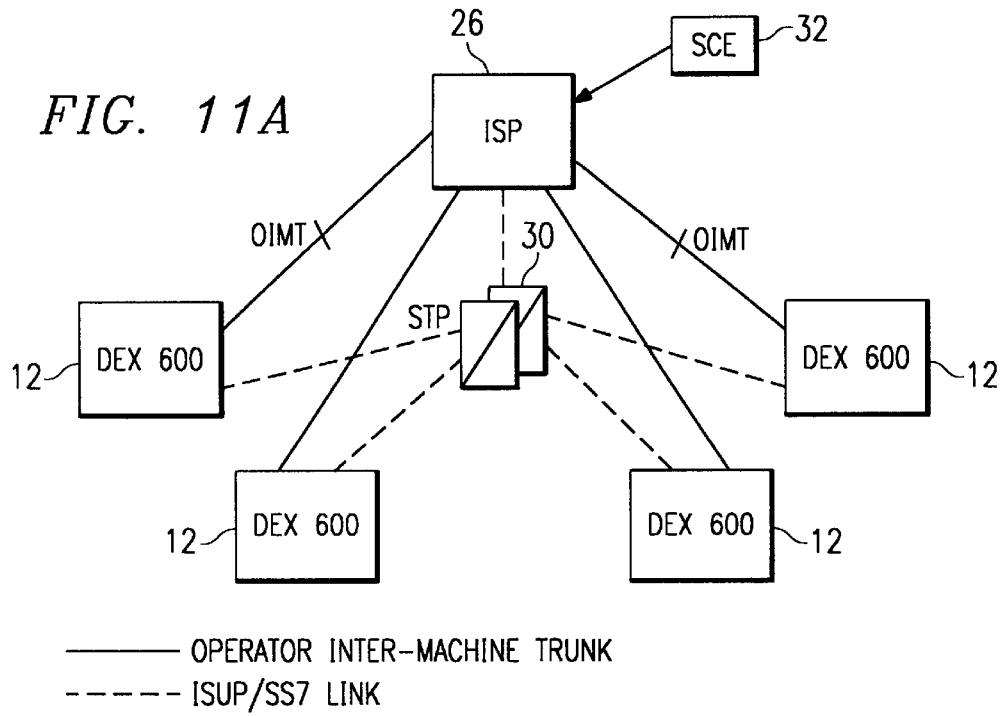
FIGS. 11A and 11B illustrate different network operating mode configurations for the intelligent service peripheral device.
Figure 11B:
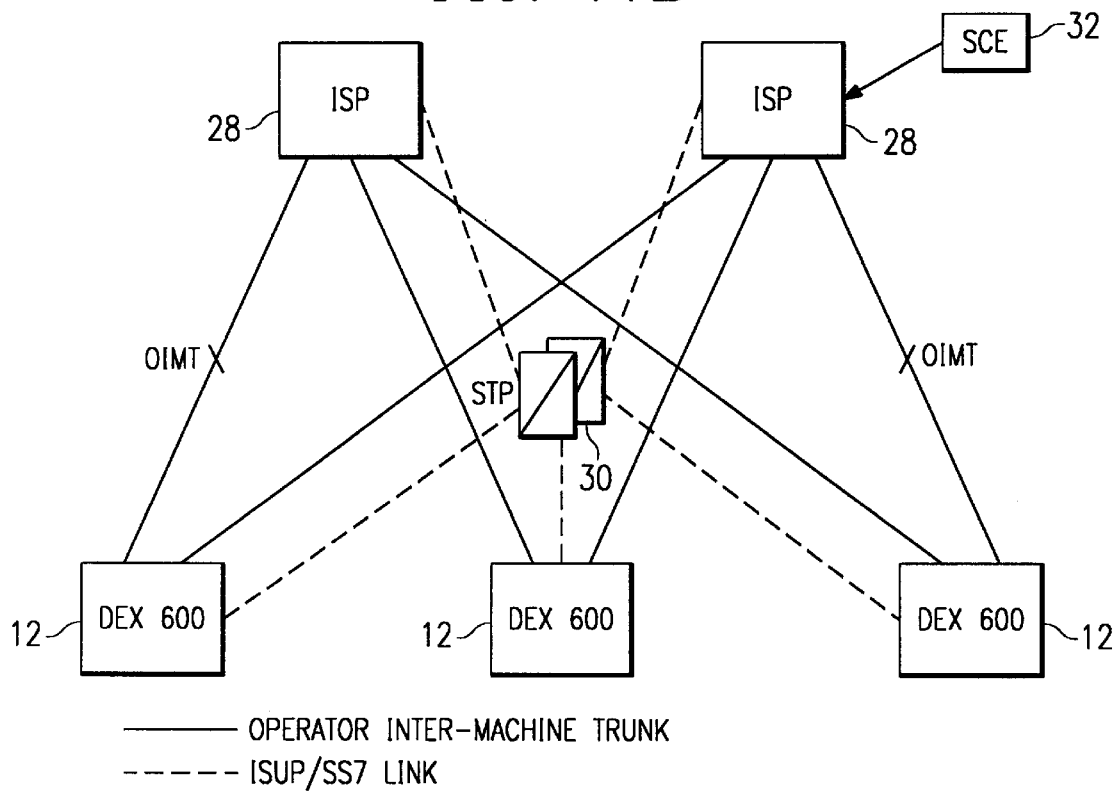

FIGS. 11A and 11B show how intelligent service peripheral device 28 may be added to a network of service switching points 12. FIG. 11A shows intelligent service peripheral device 28 connected to service switching points 12 in a simplex mode. Service switching points 12 are interconnected by a bearer path whose signaling information is carried via SS7 intermachine trunks and are connected to intelligent service peripheral device 28 by at least one operator intermachine trunk (O-IMT). The SS7 based signaling path is established between the switches and intelligent service peripheral device 28 via a mated pair of signal transfer points 30. If one of the service switching points 12 is selected as a control point, the control point may be used to select the calls which need to be routed to intelligent service peripheral device 28. If there is no control point, databases within each service switching point 12 are updated to reflect the criteria for which calls will be routed to intelligent service peripheral device 28. The criteria for which a call may be routed to intelligent service peripheral device 28 may include a given set of ANI, authorization codes, or any other desired type of criteria. All call associated parameters, such as ANI or the toll free number, are passed to intelligent service peripheral device 28 via an ISUP message. A voice path is established over the trunk between the particular service switching point 12 and intelligent service peripheral device 28. Intelligent service peripheral device 28 performs necessary functions, such as service control function based database look-up. If subscriber input is required, then a voice prompt is played to the subscriber, e.g., "please enter your four digit pin". Intelligent service peripheral device 28 then collects DTMF digits provided by the subscriber and validates them against those in its database. Intelligent service peripheral device 28 then returns appropriate destination number and/or routing package to service switching point 12 via a return ISUP message and then releases the voice path on the trunk. Service switching point 12 then completes the connection setup and starts the billing procedures.

FIG. 11B shows intelligent service peripheral device 28 connected to service switching points 12 in a mated pair mode. Preferably, no redundancy is established for intelligent service peripheral manager module 90 and media processing unit manager module 92 within intelligent service peripheral device 28. Therefore, a failure of either one of these processor modules will cause a catastrophic failure. If one of the T1 carrier interfaces 94 has a failure, then the connectivity between intelligent service peripheral device 28 and a particular service switching point 12 will be lost. The mated pair mode connection provides a more robust network implementation. For the mated pair mode connection, two intelligent service peripheral devices 28 are deployed in the network. The two intelligent service peripheral devices 28 are typically geographically separated but are logically considered as a single intelligent service peripheral device 28 operating in the mated pair mode. In the mated pair mode, operator intermachine trunks are provisioned between each service switching point 12 and the two intelligent service peripheral devices 28. The carrier trunks in the SS7 links are diversely routed. Each intelligent service peripheral device 28 is equipped so that in case of a catastrophic failure on one of the intelligent service peripheral devices 28, the surviving intelligent service peripheral device 28 can handle the processing for the entire network. Intelligent service peripheral manager modules 90 within each intelligent service peripheral device 28 keep the database synchronized. In the mated pair mode, intelligent service peripheral device 28 provides a 99.9995% network availability.

Intelligent service peripheral device 28 may be provisioned to support 1,920 ports. The ports can be grown in increments of 24 via T1 carrier interface cards 94 or in increments of 30 via E1 carrier interface cards. The processing capacity of the service control function component of intelligent service peripheral device 28 is measured in transactions per second. A typical transaction comprises three steps—receipt of message, database lookup, and transmit of looked up information. The processor architecture and the clock speed determine the transaction per second rate that can be supported. Intelligent service peripheral device 28 may be configured to support from 30 to 1,000 standard transactions per second. For services that require intelligent service peripheral resource functions, additional time is required for completing a transaction. For example, a service which requires the use of voice prompts for personal identification number digit collection might add up to 15 seconds per transaction. These types of transactions are called Media transactions per second or M-TPS. Intelligent service peripheral device 28 may be configured to support 10 to 100 Media transactions per second. Intelligent service peripheral device 28 may support interfaces such as T1 1.544 megabits per second, ISDN PRI (T1 base), SS7 56 kilobytes per second, X.25 56 kilobytes per second, ethernet 10 megabytes per second, as well as international versions of the foregoing interfaces. Intelligent service peripheral device 28 may be configured to support ETS1 CORE INAP (BA), Bellcore AIN0.1, Bellcore AIN0.2, and ITU CS-1 call models.

In summary, the intelligent service peripheral device is the realization of service deployment platform that integrates several functional elements into an environment resulting in the unique capability to take a service from concept/creation through deployment into the network. This environment also provides a ubiquitous capability across both narrowband and broadband applications. The intelligent service peripheral device may be implemented as a network version or a lab desktop version. In the lab desktop version, the intelligent service peripheral device uniquely provides a capability to create a new service or modify a service feature using a service creation environment and by extending dial tone to a set of standard analog telephones allowing the user to immediately interact with the newly created service. The lab desktop version utilizes service capability to design, create, and modify AIN/IN services. The service execution environment provides an internal service control function for service execution, a switching function for call state model execution, and special resource function to handle intelligent peripheral resources. The service execution environment is very flexible in that each functional subsystem is capable of being a stand alone element in the network. All messages passed between the functional elements are standard INAP messages. Thus, the relationship between each of the elements is defined in the ITU standards model. Due to the concept of a virtual port, the intelligent service peripheral device functionality can be utilized for narrowband and broadband applications.

This environment can thus be utilized to deliver intelligent network services at three discrete levels in the network. The highest level is the network operator and this includes long distance, local dial tone, and wireless operators. The next level starts moving the accessability of the service towards the edge of the network by extending the user interaction out to the neighborhood. The final level is to the end user, personal intelligent network services where the user has direct control over their own service environment. The intelligent service peripheral device provides a create function to build new or modified existing service and extend it into the proper context for the user, a call model or state machine to manage the user's interaction and the access to the service logic and may serve as execution environment to execute the user's service, and a special resource function to support service enhancements. The intelligent service peripheral device has a completely integrated environment to provide the capability to deliver service at all three levels.

Thus, it is apparent that there has been provided, in accordance with the present invention, and intelligent service peripheral that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. An intelligent service peripheral for a telecommunications network, comprising:

a service intelligence unit having a service processor manager module and a signaling module, the signaling module operable to receive signaling messages originating at a service switching point, the signaling messages including a request for a particular type of service associated with an Advanced Intelligent Network call, the service processor manager module providing a call model for the protocol associated with each service request, the service processor manager module operable to determine a routing package for the service request in response to call model processing, the signaling module operable to transmit the routing package to the service switching point in order to allow connection of the call to its desired destination; and a media processing unit having a media processor manager module, a carrier interface module, and a resource module, the service processor manager module operable to route service requests requiring special handling to the media processor manager module, the media processor manager module operable to process the service request and connect the call to the carrier interface module, the carrier interface module operable to provide various basic features capable of exchanging information with an originator of the call in accordance with the service request, the carrier interface module operable to interface with the resource module in order to provide various enhanced features for the call capable of exchanging information with the originator of the call and not supported by the carrier interface module, the media processor manager module operable to determine the routing package for the call in response to execution of the features provided by the carrier interface module and the resource module, the media processing unit operable to provide the routing package to the service intelligence unit for appropriate transmission to the service switching point in order to complete connection of the call to its desired destination, the service intelligence unit and the media processing unit determining connection of the call separate and independent of any service control point in the telecommunications network.

2. A method of processing a call in a telecommunications network, comprising the steps of:

receiving a signaling message from a service switching point, the signaling message including a request for a particular type of service associated with an Advanced Intelligent Network call;

executing a call model associated with the service request;

interpreting a service logic program associated with the service request in response to execution of the call model;

determining whether service resources are to be performed for the call;

connecting the service resources to an originator of the call in response to a determination that service resources are to be performed;

exchanging information between the service resources and the originator of the call;

determining a routing package in response to the exchanging of information;

providing the routing package to the service switching point to allow the service switching point to connect the call to an intended destination; and releasing the connection between the service resources and the originator of the call, wherein the call is processed independently of any service control point within the telecommunications network.

* * * * *